Patented Feb. 6, 1923.

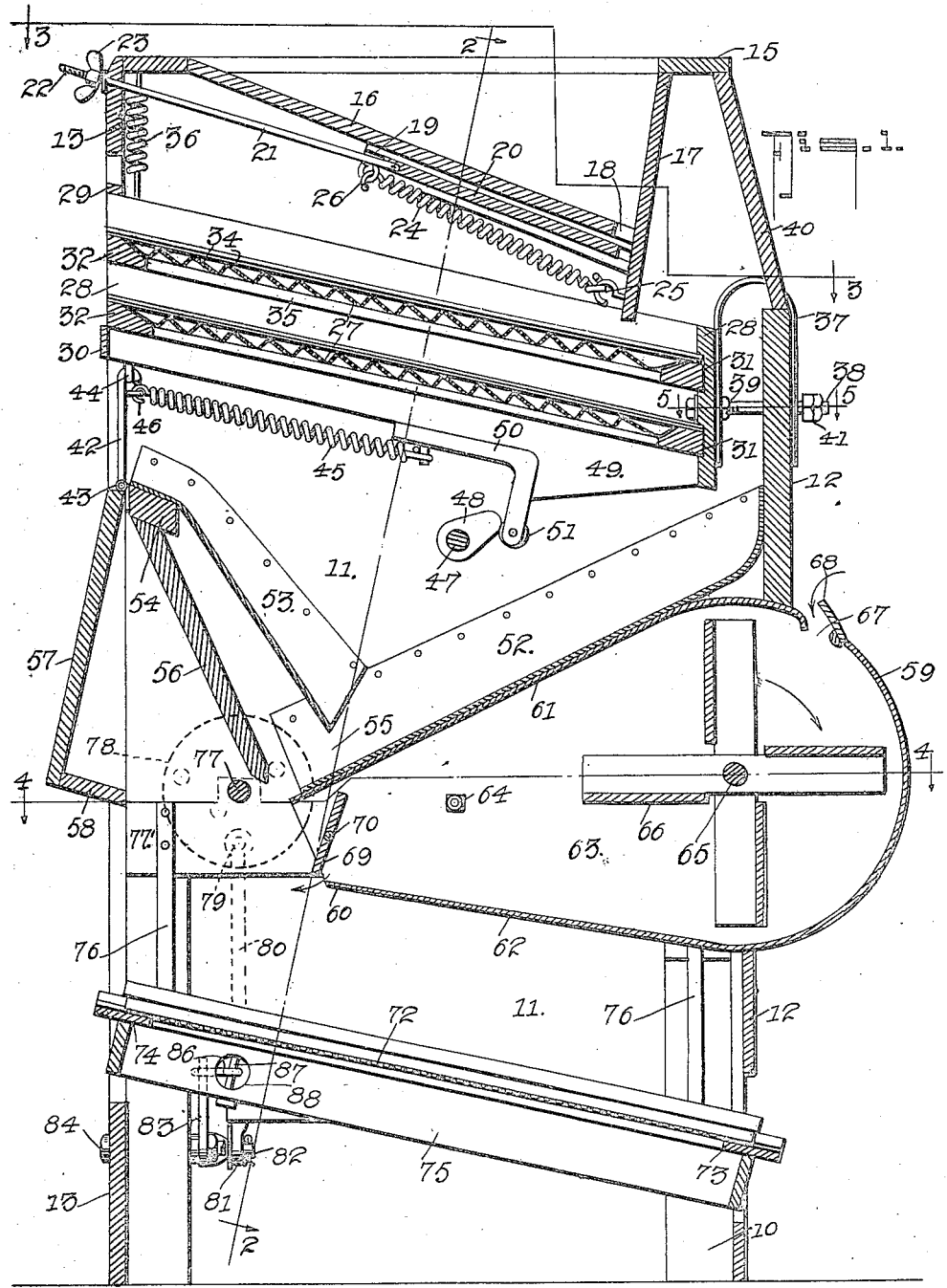

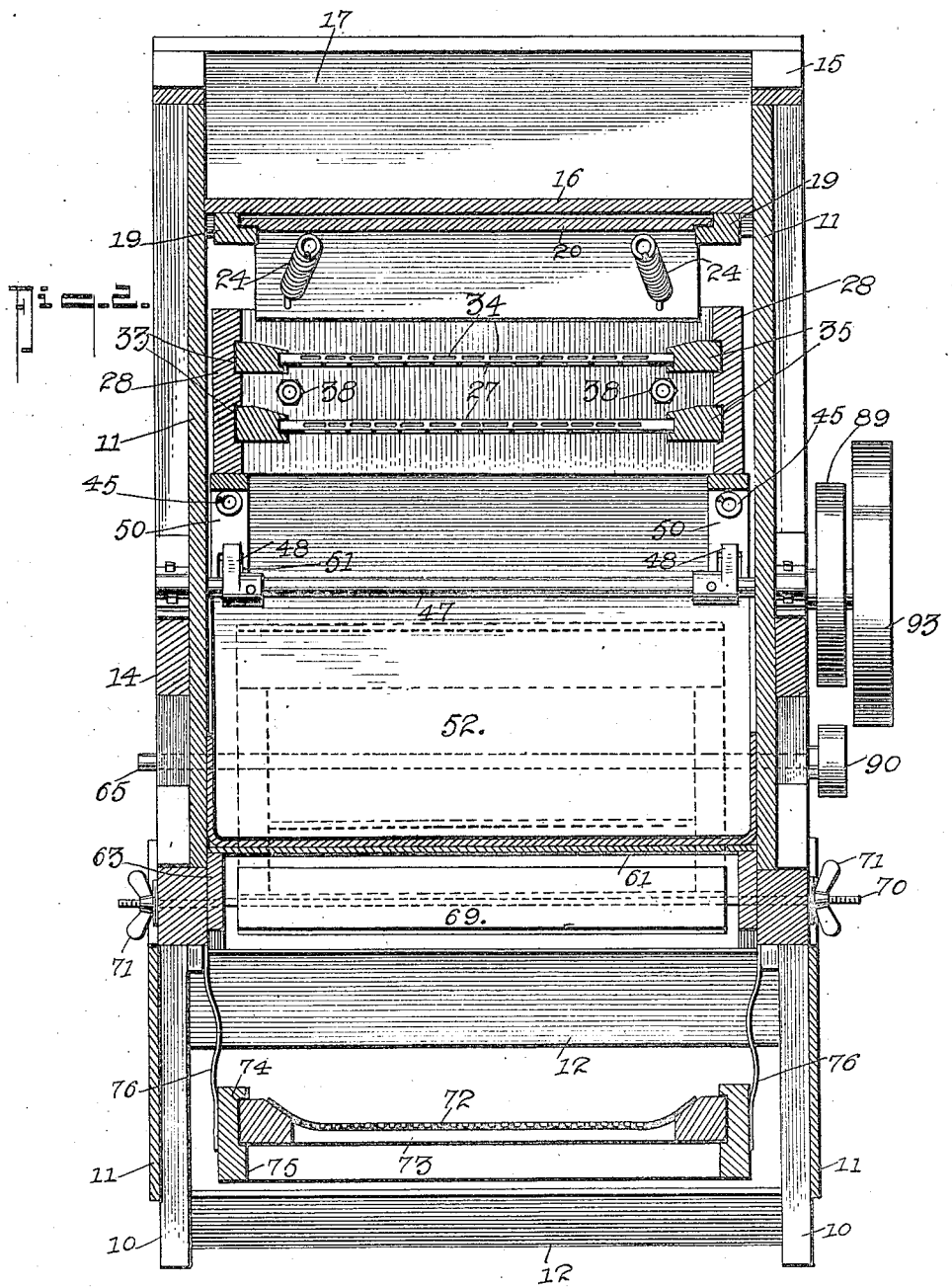

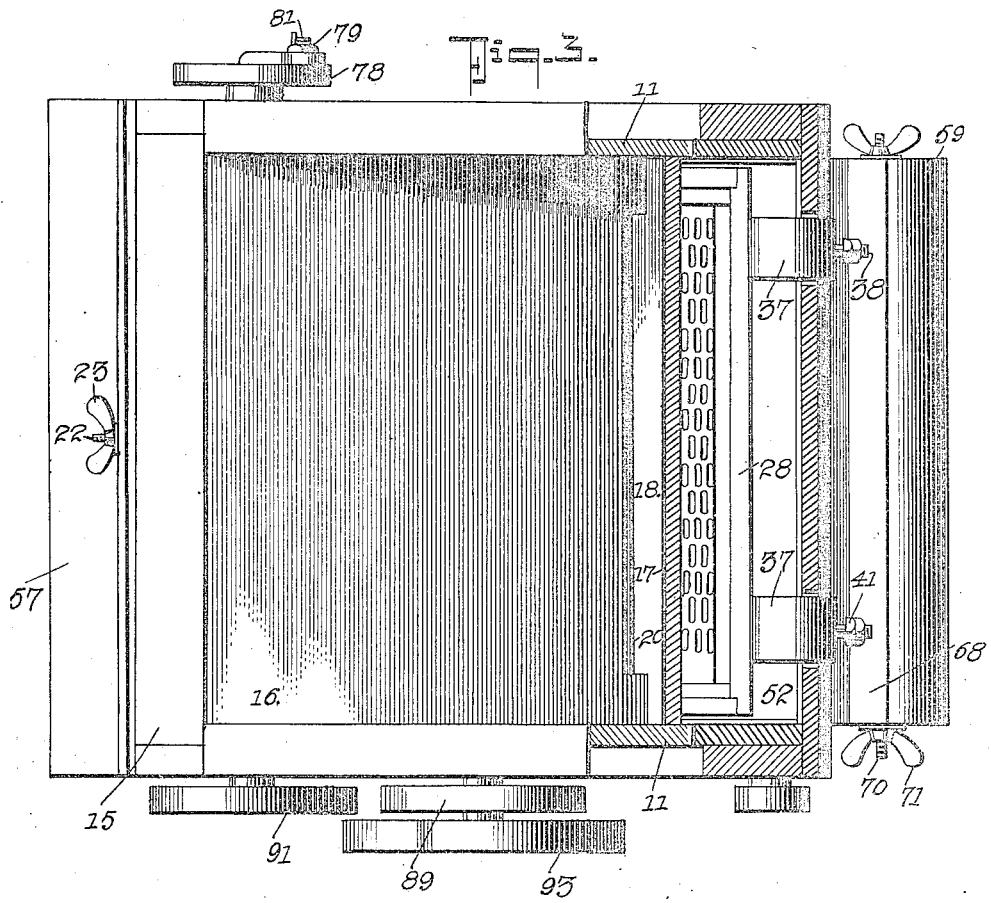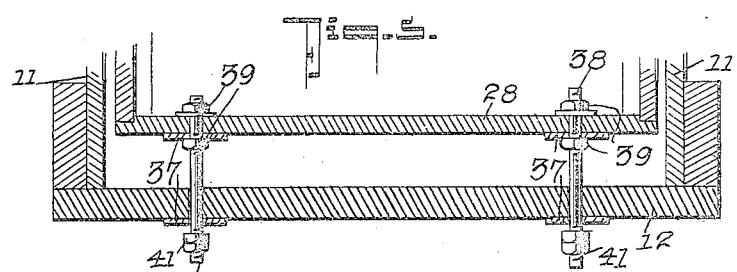

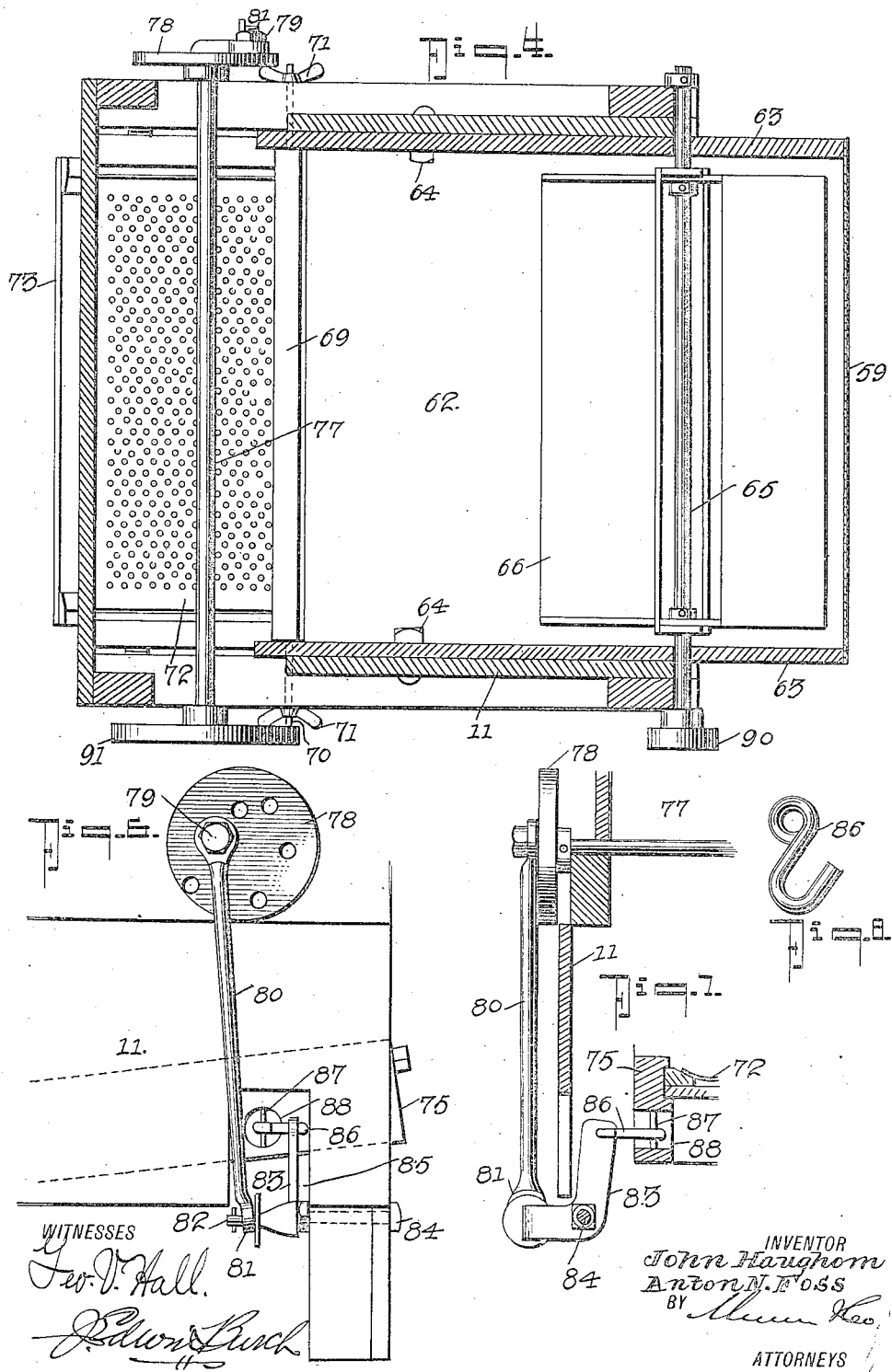

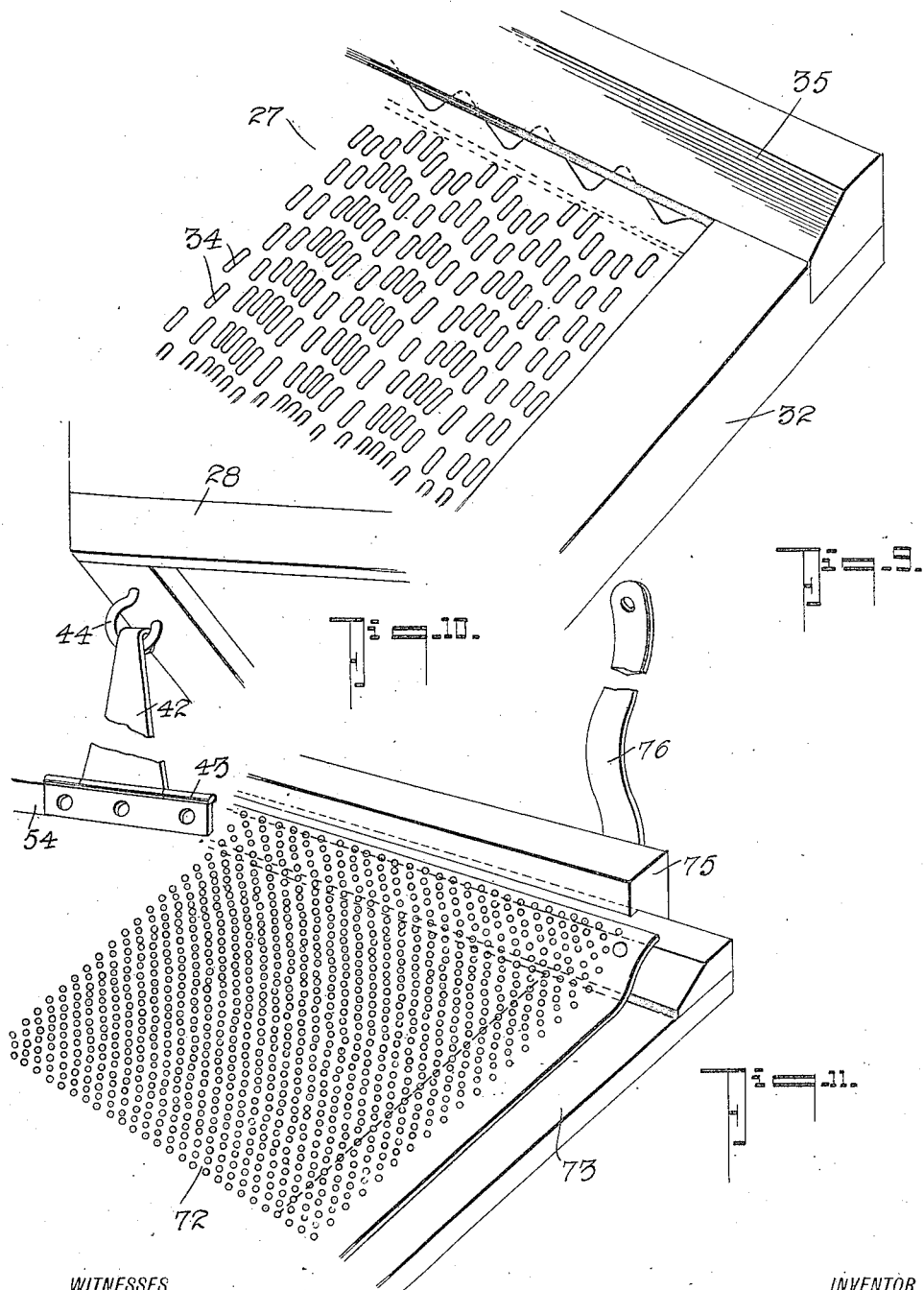

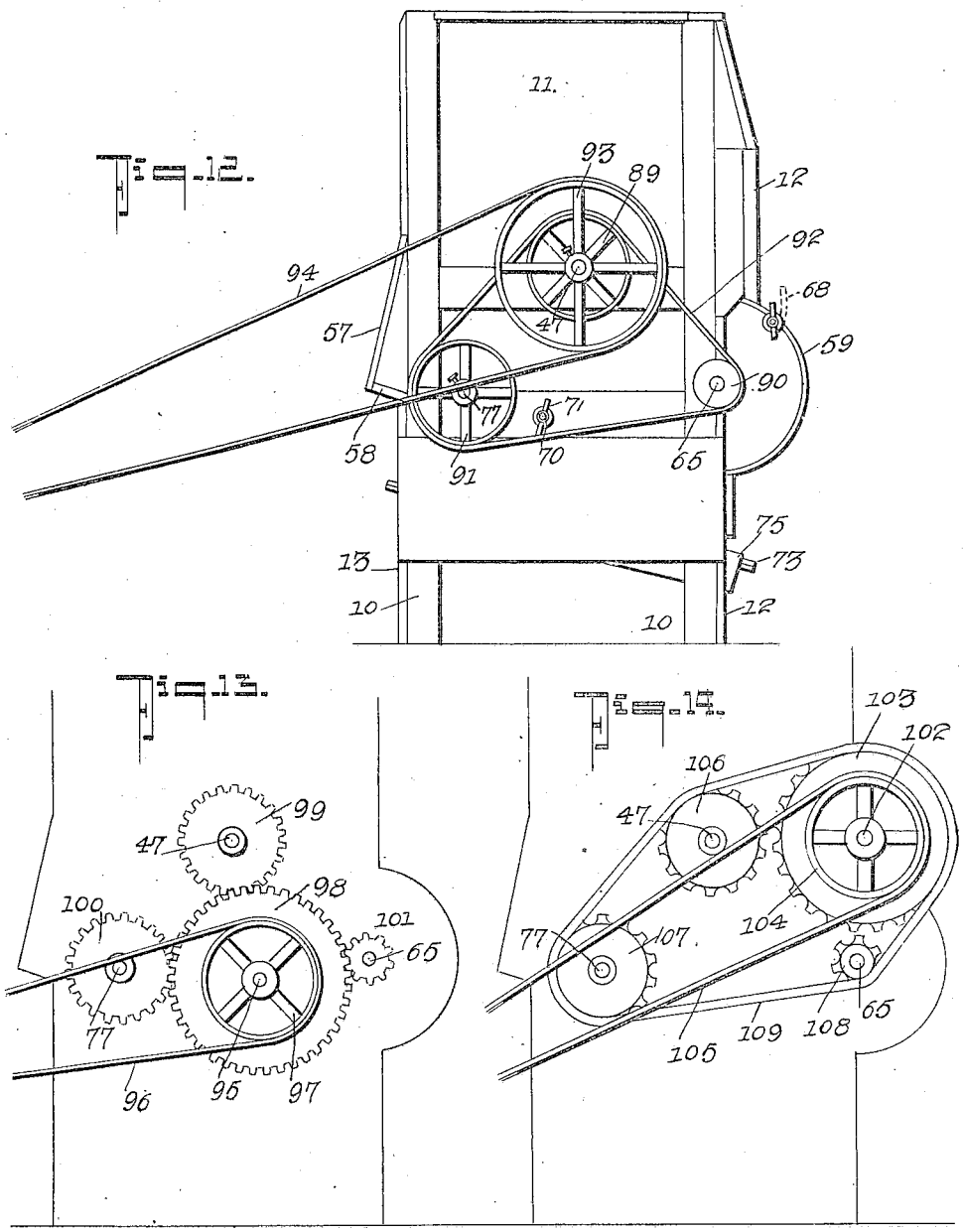

1,444,506

UNITED STATES PATENT OFFICE.

JOHN HAUGHOM AND ANTON N. FOSS, OF FARGO, NORTH DAKOTA.

GRAIN AND SEED CLEANING MACHINE.

Application filed July 29, 1920. Serial No. 399,878.

*To all whom it may concern:*

Be it known that we, JOHN HAUGHOM and ANTON N. FOSS, citizens of the United States, and residents of Fargo, in the county of Cass and State of North Dakota, have invented certain new and useful Improvements in Grain and Seed Cleaning Machines, of which the following is a specification.

This invention relates to a separator or cleaning machine for grain and seeds, the object of the invention being to provide a novel form of grain and seed mill or separator adapted to effectively and thoroughly clean the seed of all straw and chaff or other like particles and to generally enhance the value and to increase the utility of devices of the character to which the invention relates.

A further object of the invention is to provide an improved separator or cleaning machine having a screen supporting riddle provided with novel means for shaking or agitating the same with a kicking or forward and backward motion and to so construct the screens that a more efficient cleaning action is produced and clogging thereof prevented.

A further object of the invention is to so construct the screens of perforated sheet metal or other reticulated material in which the mesh or the size of the openings may be varied according to the kind of grain to be cleaned, thus adapting the device for cleaning flax, wheat, clover and timothy, or other seed or grain.

A still further object of the invention is to provide improved means for imparting a reciprocating motion to the screens which are removably supported in the riddle or riddle frame and in connection with positive means for shifting the same in one direction to cause a rebound or motion in the opposite direction as well as an upward motion causing the grain or seed to be thoroughly agitated in order that a more efficient cleaning and separating action will be produced.

A still further object is to provide a machine of the class described, in combination with the agitating riddle screens above set forth, a blow fan having means for regulating the supply of air to the same as well as the blast, together with the direction and force of the discharge, in combination with means for preventing the escape of grain, and a sieve simultaneously operated with the operation of the screen from a single source of motive power or the same prime mover, so that a lateral or sidewise shaking or reciprocating motion will be imparted thereto to cause proper discharge of the grain or seed and the discharge in the opposite direction of the chaff or other fine particles separated therefrom, the distance between the screens and sieve being so regulated as to permit a very thorough cleaning action and at such an angle as to prevent discharge of the grain therewith.

Among the other objects of the invention is to provide an improved driving means and operative connections between the same and the riddle for agitating the same and the screens thereof, for operating the blow fan and for operating the sieve, in a direction at right angles to the direction of agitation of the screens so as to improve the cleaning action, as well as to simplify and render more durable the construction of the device and operating parts.

Other and further objects of our invention will become readily apparent to persons skilled in the art, from a consideration of the following description when taken in conjunction with the accompanying drawings, wherein:—

Figure 1 is a central vertical sectional view of the improved grain and seed cleaning machine or separator.

Figure 2 is a transverse sectional view taken on the line 2—2 of Figure 1.

Figure 3 is a transverse horizontal sectional plan view taken on the staggered line 3—3 of Figure 1.

Figure 4 is a transverse horizontal sectional view taken on the line 4—4 of Figure 1.

Figure 5 is a fragmentary horizontal sectional view taken on the line 5—5 of Figure 1.

Figure 6 is a fragmentary side elevation showing the agitating or shaking means for the sieve.

Figure 7 is a vertical sectional elevation of the arrangement shown in Figure 6.

Figure 8 is a detail of a connection employed in the operating means shown in Figures 6 and 7 for connecting the same with the sleeve.

Figure 9 is a fragmentary perspective view of one of the screens.

Figure 10 is a detail fragmentary perspective view showing a pivotal support for the riddle frame, Figure 11 is a fragmentary perspective view of a portion of the sieve, Figure 12 is a side elevation of the cleaning machine or separator and showing a preferred form of driving means, Figure 13 is a similar fragmentary view of a modified form of driving means, and Figure 14 is a similar view of a still further form of driving means.

Referring to the drawings in detail, in which like reference characters designate corresponding parts throughout the several views, our improved grain and seed cleaning machine or separator is shown as comprising a substantially rectangular frame 10 having corner supporting legs and provided with side walls 11, a back wall 12 and a front wall 13, the front portion however, being substantially open. The frame or rectangular box-like structure forming the body of the machine may be of any preferred construction, but as shown, is provided with the usual panels forming the sides, back and front, and reinforcing strips 14 constituting the frame proper. It is also to be understood that the walls or portions constituting the frame are suitably bolted or otherwise secured together in order to produce a rigid structure.

At the top, there is provided a surrounding ledge or frame portion 15 in which is arranged a hopper including an inclined hopper board 16 and a back board 17 disposed in spaced relation with respect thereto to form a discharge opening 18 at the bottom, it being understood that the grain or seed to be cleaned or separated is deposited or discharged into the hopper in proper quantities for feeding the same in the working parts for cleaning the chaff, straw, and other foreign particles therefrom.

However, in order to regulate the feeding of the material through the slot or opening 18, the bottom of the board 16 is provided with opposed guideways 19 receiving therein a slide or board 20 which is movable at its rear edge over and beneath the opening 18, the opposite edge being connected pivotally with a rod or stem 21 which projects through the front portion of the body or frame on an incline and has its outer edge threaded as indicated at 22, for engagement by a wing or thumb nut 23, in order that the slide may be adjusted to vary the size of the opening through which the material is discharged beneath or fed into the machine. The slide is normally retained in a closed position against the back board 17, as though the medium of resilient helical springs 24 which have connection with the board 17 beneath the slide 20 as indicated at 25, and with the opposite edge of the slide, as indicated at 26, thus serving to exert pull or strain thereon against the action of the nut 23 when turned on the threaded end of the rod bolt 21, in order to enlarge the opening or slot 18, or to permit a reduction in the size thereof when the slide is acted on by the springs due to the loosening of the nut and the lengthening of the rod between the point of connection thereof with the slide and the front wall or inner face of the nut.

It should also be noted that the board 17 extends downwardly below the slide and is adapted to discharge the seed or grain onto the screens 27 which are arranged in superposed relation and form part of a riddle including a riddle frame 28, any number of which may be arranged across the machine, but preferably one or two. The riddle frame is of rectangular construction, being substantially open at the forward end, except for connecting strips 29 and 30 and is provided with a plurality, preferably a pair of guideways or grooves 31 receiving the frames 32 of the screens slidably therein, in order that the screens may be conveniently placed in position or removed and to form tight joints around the opposite sides and back thereof. It should also be noted that the inner edges of the side portions of the screens are provided with grooves to receive the opposite edges of the screens 27, as indicated at 33, and said screens are formed of perforated sheet metal, foraminous or reticulated material having a plurality of staggered or alined elongated perforations or openings 34 therethrough, permitting chaff and other foreign particles to sift through, together with the seed or grain, and said screen is corrugated transversely, portions thereof being bent at right angles as indicated at 34 and forming ridges preferably about twice as long as they are deep. This material is preferably the usual zinc screen material consisting of sheet metal properly perforated and the ridges or corrugations will be about one-half inch deep and about one inch apart in the entire length of the screen, though this will be varied in accordance with the grain or seed in connection with which the machine is used, such as flax, wheat, clover and timothy, or the like. The opposite ends of the screen are secured against the beveled edges 35 of the front and rear portions of the screen frames in order to anchor the same and arrange said portions at opposite inclinations in order that free discharge will be prevented.

The riddle or riddle frame fits between the sides of the body or frame proper for forward and backward shaking motion or agitation, means being provided to reciprocate the same as will be hereinafter more fully described. Its forward end is suspended at the sides by means of detachably arranged helical suspension springs 36 serving to maintain an upward tension on the riddle frame, while the rear or back portion thereof is connected to the forward depending leg portions of a pair of inverted U-shaped springs 37, clamping bolts 38 being employed for this purpose and extending horizontally through the back portion or panel of the body or frame, which latter may be of increased thickness and in the form of a heavy beam, for this purpose, if desired, in order to withstand the strain and pressure exerted thereon due to the expansion and contraction of the spring while the riddle is reciprocated when the machine is operated to clean the seed, as will be later described. The bolts 38 are extended through the back portion of the riddle frame between grooves for receiving them and have nuts 39 threaded or mounted thereon against the frame and spring respectively in order that the adjacent leg of the latter will be secured or anchored against the back of the riddle frame and held from movement with respect thereto. The other leg portions of the springs are extended against the outer face of the back portion and through openings in a panel 40 forming a part of the same at the bight or bent portions of the springs which are upwardly disposed, in addition to passing through the back portion and the bolts have nuts 41 engaged thereon in order to limit the forward displacement of the riddle frame under the action of the springs, it being understood that the portions disposed against the outer face of the back are anchored thereto in order that the inner portions will spring away from the same and thus force the riddle frame forwardly after it has been pushed rearwardly and released.

The front portion of the riddle frame is pivotally supported upon hinges or supporting rods or hangers 42 pivoted or hinged as shown at 43 to the front portion of the frame at their lower ends, and having their upper ends detachably connected to the bottom portion of the riddle frame as indicated at 44. These hangers serve to support the riddle frame for forward and backward agitation or reciprocation and the depending side portions of the frame of the riddle have connected thereto at each side of the body or frame of the machine, contractile helical springs 45 at the rear ends of the latter, the forward ends of the springs being connected to the sides 11 of the frame, as indicated at 46, in order to normally draw the riddle frame in a forward position in conjunction with the springs 37 while the springs 36 tend to impart an upward movement thereto when the riddle frame has been released and moved to a forward position after having been moved rearwardly, during the reciprocation or agitation thereof.

In order to impart a positive rearward motion to the riddle frame, a shaft 47 is journalled transversely to the frame being arranged in bearings supported by the horizontal side panels 14 heretofore referred to and suitably held against longitudinal movement or end thrust. This shaft carries a plurality of cams or eccentric arms 48, disposed in alinement with the side extensions 49 of the riddle frame. These extensions are recessed or cut out beneath to accommodate L-shaped or right angular bearing plates 50, in the lower ends of which rollers 51 are journalled to reduce wear and friction between the cams and the depending portions of said right angular plates which are disposed in the path of the cams during the rotation of the shaft 47. Thus, it will be seen that as the shaft is driven by any suitable means or prime mover, the cams will contact with the rollers or abutments formed by the depending portions of the plates in which the rollers are journalled and thus force the same rearwardly, together with the riddle frame against the action of the springs 37 and 45, the supports 42 swinging on their pivots 43 to maintain the riddle frame against downward movement. This is assisted by the action of the springs 36, and when the cams pass by the rollers 51, the springs 37 and 45 will immediately return the riddle frame forwardly with a quick jerky or kicking motion and the springs 36 will then suddenly move the same upwardly a short distance in order to cause or allow the grain to jump up from the riddle screens to insure thorough agitation and prevent clogging, as well as to produce a more efficient screening operation. As shown, the lower ends of the plates 50 are bifurcated to receive the rollers 51 therein, upon shafts engaging the opposed furcations, but it is to be understood that any other suitable anti-friction means may be provided in lieu of the rollers.

Arranged beneath the shaker or agitating screens is a second hopper including an inclined section 52 preferably of sheet metal and having its upper end secured against the back portion and its sides secured against the inner faces of the sides of the frame or body, the lower end thereof being unobstructed and open throughout the width thereof. This section inclines forwardly and downwardly from the back, and cooperating therewith is a second inclined section 53 also secured to the sides and to a cross member 54 between the same, the lower end of the section 53 being likewise open and unobstructed, and arranged in spaced relation to the bottom face and lower end of the secction 52, in order to provide an opening 55 through which the grain may pass. In front of the section 53 is a wind board 56 which may be adjustably arranged through the medium of a set screw to allow the same to be raised or lowered according to the weight of the grain. Also arranged below the riddle and in front of the wind board 56 and inclined forwardly and downwardly, is a grain board 57, the same extending from the cross member 54 which also serves to support the hangers 42, while the bottom portion is closed by a rearwardly and downwardly inclined board 58 adapted to discharge any grain therefrom as well as to prevent coarse screening and chaff from escaping from the mill. It should also be noted that the wind board 56 terminates at a spaced distance from the lower end of the discharge spout or hopper formed by the sections 52 and 53, thus permitting the grain to be readily discharged and the discharge regulated as desired.

Immediately below the section 52 at the back, there is provided an opening for receiving a blower fan casing 59 having a rounding portion projecting outwardly and tapered toward its discharge end 60 so that the top portion 61 slopes downwardly and the bottom portion 62 slopes upwardly in a lesser degree than the downward slope of the top portion. This casing is preferably of sheet metal, except the side portions 63 which are preferably of wood and are detachably secured in position or bolted to the sides 11 of the frame or body, as indicated at 64, in order that the same may be readily secured in position or removed for adjustment or repair. Journalled through the side portions 63 and the sides 11 of the frame or body axially of the circular portion 59 of the casing, is a transverse shaft 65 bearing the blow fan 66 having a plurality of blades or paddles, preferably four in number, to create the necessary air blast for cleaning the seed or grain by separating the chaff and other light or fine particles from the same. The casing 59 is provided with suitable openings at the ends or top portion thereof, as indicated at 67 for supplying air to the interior of the casing, being drawn through as the fan rotates and the supply thereof being regulated by a gate or shutter 68, preferably hinged in position adjacent the opening at the top portion of the exposed part of the casing. At the discharge end of the casing, there is disposed a pivoted wind shutter 69, the pivots 70 of the shutters being adjustable so as to vary the angular disposition of the shutters in order to regulate the discharge of the blast from the casing through the medium of wing nuts 71 conveniently disposed at the exterior of the frame or body and adapted to be manipulated to permit turning of the shutters and to hold the same in adjusted positions. The discharge end of the blow fan casing is also disposed beneath the wind board 56 and the grain board 57 and the front of the casing toward which the blast of air is discharged or blown, is open for a considerable distance in addition to the novel angular relation of the fan and casing, so that as the grain is falling from the chute, the chaff will be blown or separated therefrom with the result that the grain will be more thoroughly cleaned than in machines of the usual type.

The grain is adapted to drop on a sieve 72, which latter is supported in or carried by a frame 73, and is preferably of foraminous or reticulated material, such as zinc or other sheet metal properly perforated, the perforations or mesh of the sieve 72 being smaller than the screens, in order that the grain will be prevented from dropping through, but at the same time, to permit the dust and finer particles to drop through the perforations or openings. The frame 73 is designed to detachably engage the guides or grooves 74 in the opposite sides of the sieve frame 75 which is supported in a rearwardly and downwardly inclined position from the front opening toward which the air blast is discharged and an opening in the back portion at a lower level. The frame is supported for sidewise or lateral agitation or swinging movement through the medium of hanger strips 76 suspended from the inside panels 77' of the frame or body and at a spaced distance from the side walls thereunder, in order that free motion of the sieve and frame thereof will be permitted, the hanger strips bending or flexing in order to allow the required agitation to insure discharge of the grain at the rear end of the sieve, and being of flexible spring metal.

In order to impart the sidewise or lateral shaking motion to the sieve frame and sieve therein, there is journalled transversely through the frame or body sides 11, immediately forwardly of the top of the blow fan casing, a shaft 77, on one end of which outwardly of the frame side is fixed an eccentric or crank disk 78 to which is eccentrically connected detachably through the medium of the crank pin 79, the apertured upper end of the connecting rod 80 which has its lower end also apertured and bent at right angles as indicated at 81 while the upper portion is disposed parallel to the crank disk. The apertured lower end is pivotally engaged with the rearwardly extending end or trunnion 82 of an angle or bell-crank lever 83 which is pivoted at its bight portion to one of the connecting bolts 84 connecting the front and side portions forming the leg 10, a cut out or notch 85 being provided in the adjacent portion of the side to accommodate said lever and permit the necessary rocking movements thereof. The trunnion 82 is formed as a reduced extension of the lower or short arm of the lever 83 and projects at right angles to the plane of said lever, the latter extending crosswise and having its longer arm connected at its upper end through the medium of a hook and eye connection 86 with a cross pin 87 arranged in an opening 88 at one side of the sieve frame 75. In this way, as the shaft 77 is driven, the crank disk will be rotated, thus actuating the connecting rod 80 and causing an oscillation of the rock lever 83, with the result that the sieve frame and sieve carried thereby will be caused to shake or agitate transversely at right angles to the direction of motion imparted to the shaker screens above described, this being permitted and facilitated by the resilient strips forming the hangers 76 while the sidewise motion assists in the discharge of the grain at the back end. It will also be understood that the mesh of the screens and sieve or the size of the perforations therein will be varied in accordance with the kind of seed or grain to be cleaned, as it is thought will be manifest to persons skilled in the art. The sieve 72 as particularly shown in Figure 11 of the drawings, is provided with circular perforations of relatively fine mesh or comparatively small size.

Thus, in the operation of the device, the grain or seed is fed into the hopper at the top of the machine, the discharge thereof into the screens being regulated as heretofore described. The screens are then simultaneously agitated by the rotation of the shaft 47, while driving the shaft 65 and thus the blast fan, and causing agitation or reciprocation of the sieve in a path or direction at right angles to the path or direction of agitating motion of the screen. As the grain is discharged into the chute or hopper formed by the sections 52 and 53, the latter will fall or drop in front of the blast fan casing onto the sieve, running down into this and being discharged at the back. The seed and grain will be thoroughly cleaned owing to the distance between the discharge end of the chute and the sieve and the peculiar angle at which the blast of air is discharged against the falling seed and grain, so that the chaff and other light particles and dust are effectively separated and blown from the same. The inlet and discharge of the air can be effectively regulated by the shutters 68 and 69.

In order to impart rotation to the shafts 47, 65 and 77, either of the drive mechanisms shown in Figures 12, 13, and 14 may be employed. As shown in Figure 12, there is fixed to the projecting end of the shaft 47 a pulley 89 and on the shaft 65, a pulley 90, while fixed to the shaft 77 is a pulley 91, a belt or other endless drive member 92 being trained around the pulleys so that the same may be rotated. Owing to the fact that the pulley 90 is smaller than the pulleys 89 and 91, it will be obvious that the blast fan will be rotated at a relatively high speed as required, the other shafts rotating at about the same speed. The projecting end of the shaft 47 also carries a large drive pulley 93 around which a drive belt 94 is trained, said belt being driven from any suitable source of power or prime mover in order that economical operation of the machine may be accomplished.

In Figure 13 of the drawings, an auxiliary shaft 95 is provided driven by a belt 96 engaged or trained upon a pulley 97 fixed to the shaft 95, which latter has also fixed thereto a large spur gear 98 meshing with a smaller spur gear 99 on the shaft 47 and a spur gear 100 on the shaft 77. It further meshes with a pinion or spur gear 101 on the shaft 65, the pinion 101 being relatively small, in order that the proper speed of rotation will be imparted to the blow fan.

In Figure 14 of the drawings, an auxiliary shaft 102 is provided at the back carrying a sprocket wheel 103, said shaft also carrying a pulley 104 engaged by a drive belt 105 corresponding to the drive belts 94 and 96 heretofore described. The shaft 47 carries a sprocket wheel 106 and the shaft 77 carries a sprocket wheel 107 corresponding to the sprocket wheel 106, while a smaller sprocket wheel 108 is carried by the shaft 65. A sprocket chain 109 is engaged around all of said sprocket wheels, being driven from the sprocket wheel 103, so as to impart the necessary rotation to the shafts 47, 65 and 77, as heretofore described. It is to be understood that power may be derived from any suitable prime mover or the device may be operated by hand if necessary.

In view of the foregoing, it is thought that the operation of the device will be readily understood, and in view of the simplicity and practical value that it will commend itself to those skilled in the art.

Having thus described our invention, what we claim is:

1. The combination with a cleaning machine frame having a hopper provided with a discharge opening and means for regulating the discharge of material therethrough; of a plurality of inverted U-shaped springs mounted at the back of the frame, a riddle having a frame, bolts connected to the riddle frame and passed through the back of the machine frame, the leg portions of the springs being connected to the respective frames and retaining the riddle frame forwardly displaced, screens mounted in said riddle frame, means for imparting a backward movement to the riddle frame, and means swingingly supporting the bottom of the riddle frame at the front thereof, the springs serving to return said riddle frame to a forward position upon release of the rearwardly actuating means.

2. The combination with a cleaning machine frame having a hopper provided with a discharge opening and means for regulating the discharge of material therethrough;

of a plurality of inverted U-shaped springs mounted at the back of the frame, a riddle having a frame, bolts connected to the riddle frame and passed through the back of the machine frame, the leg portions of the springs being connected to the respective frames and retaining the riddle frame forwardly displaced, screens mounted in said riddle frame, means for imparting a backward movement to the riddle frame, a shaft journalled transversely through the frame and provided with cams, abutments carried by the sides of the riddle frame for engagement by said cams to impart a backward movement to the riddle frame, springs connecting the riddle frame to the frame of the machine to return the same to a forward position upon release of said cams from the abutments, means to limit the forward movement of the riddle frame, and means to impart an upward jumping motion to the riddle frame.

3. In a seed cleaning machine, a riddle frame, hinged supports for the same permitting limited upward movement thereof, spring means supporting the opposite end of the riddle frame, said spring means serving to move the riddle frame in one position, additional spring means serving to similarly move the riddle frame, said riddle frame having recessed portions, angular abutments in said recessed portions and provided with anti-friction means at their projecting lower ends, a shaft rotatably mounted, and cams on the shaft for engaging said anti-friction means on the abutments to agitate the riddle frame as the shaft rotates.

4. In a seed cleaning machine, a riddle frame, hinged supports for the same permitting limited upward movement thereof, spring means supporting the opposite end of the riddle frame, said spring means serving to move the riddle frame in one position, additional spring means serving to similarly move the riddle frame, said riddle frame having recessed portions, angular abutments in said recessed portions and provided with anti-friction means at their projecting lower ends, a shaft rotatably mounted, cams on the shaft for imparting movement to the riddle frame in one direction by engagement with said abutments, and springs between the top of the frame and the riddle frame to impart a jumping motion to the riddle frame when the same is released from the cams.

5. A riddle including a frame having guideways, and a plurality of screens in said guideways, said screens comprising frames, said frames having grooves at their opposed sides and having inwardly beveled end portions, screens having their side edges fitted in said grooves and having the ends thereof directed upwardly against said beveled portions and anchored thereto.

6. A riddle including a frame having guideways, and a plurality of screens in said guideways, said screens comprising frames, said frames having grooves at their opposed sides and having inwardly beveled end portions, screens having their side edges fitted in said grooves and having the end thereof directed upwardly against said beveled portions and anchored thereto, said screens being adapted for disposition in inclined planes.

JOHN HAUGHOM.
ANTON N. FOSS.